(12) United States Patent
Sapek

(10) Patent No.: US 8,639,765 B2
(45) Date of Patent: *Jan. 28, 2014

(54) AUTOMATED MODERATION OF DISCUSSION LISTS

(75) Inventor: Adam Sapek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/079,827

(22) Filed: Apr. 5, 2011

(65) Prior Publication Data

US 2011/0179130 A1    Jul. 21, 2011

Related U.S. Application Data

(63) Continuation of application No. 11/179,940, filed on Jul. 12, 2005, now Pat. No. 7,945,625.

(51) Int. Cl.
*G06F 15/16* (2006.01)

(52) U.S. Cl.
USPC .......................... 709/206; 709/203; 709/204

(58) Field of Classification Search
USPC .................................. 709/203–207
See application file for complete search history.

(56) References Cited

U.S. PATENT DOCUMENTS

| | | | | |
|---|---|---|---|---|
| 6,708,201 B1 * | 3/2004 | Chesley | | 709/205 |
| 7,185,065 B1 | 2/2007 | Holtzman et al. | | |
| 7,328,242 B1 | 2/2008 | McCarthy et al. | | |
| 2002/0091768 A1 * | 7/2002 | Balasubramanian | | 709/204 |
| 2003/0225870 A1 | 12/2003 | Sandadi et al. | | |
| 2004/0216113 A1 | 10/2004 | Armstrong et al. | | |
| 2004/0236832 A1 | 11/2004 | Morris et al. | | |
| 2006/0031533 A1 * | 2/2006 | Goodman et al. | | 709/227 |
| 2006/0059235 A1 * | 3/2006 | Peterson et al. | | 709/206 |
| 2006/0123127 A1 | 6/2006 | Littlefield | | |

OTHER PUBLICATIONS

Non-Final Official Action dated Jan. 29, 2009, for related U.S. Appl. No. 11/179,940, filed Jul. 12, 2005, 10 pgs.
Final Official Action dated Aug. 25, 2009, for related U.S. Appl. No. 11/179,940, filed Jul. 12, 2005, 13 pgs.
Non-Final Official Action dated Mar. 5, 2010, for related U.S. Appl. No. 11/179,940, filed Jul. 12, 2005, 12 pgs.
Final Official Action dated Aug. 17, 2010, for related U.S. Appl. No. 11/179,940, filed Jul. 12, 2005, 17 pgs.
Notice of Allowance dated Jan. 14, 2011, for related U.S. Appl. No. 11/179,940, filed Jul. 12, 2005, 11 pgs.
Response to Office Action dated Jan. 29, 2009 in U.S. Patent No. 7,945,625. Response dated Apr. 29, 2009.
Response to Office Action dated Aug. 25, 2009 in U.S. Patent No. 7,945,625. Response dated Dec. 22, 2009.
Response to Office Action dated Mar. 5, 2010 in U.S. Patent No. 7,945,625. Response dated Jun. 7, 2010.
Response to Office Action dated Aug. 17, 2010 and Request for Continued Examination in U.S. Patent No. 7,945,625. Response dated Nov. 30, 2010.

* cited by examiner

*Primary Examiner* — Yasin Barqadle
(74) *Attorney, Agent, or Firm* — Kelly, Holt & Christenson PLLC

(57) ABSTRACT

Within a network-based discussion environment, a moderation mechanism is implemented to encourage posts of high relevancy. The moderation mechanism is configurable so as to support distributed access control. In one case, the moderation mechanism is configured to support an allocation of a limited number of responses to a user based on the number of new threads the user has started.

11 Claims, 5 Drawing Sheets

AUTOMATED MODERATION OF DISCUSSION LISTS

CROSS-REFERENCE TO RELATED APPLICATION

The present application is a continuation of and claims priority of U.S. patent application Ser. No. 11/179,940, filed Jul. 12, 2005, the content of which is hereby incorporated by reference in its entirety.

BACKGROUND

Network-based (e.g., Internet-based) discussion environments are becoming increasingly popular. One general example of a network-based discussion environment is a discussion forum. A discussion forum supports a casual discussion of topics amongst users. A user, as desired, posts ideas, opinions or information and reads responses posted by other users. In many cases, posts and replies are tracked and displayed in a hierarchical tree-like manner. Posts that start new topics are commonly displayed at the top of a tree, and corresponding replies are shown indented beneath the original posts. Some forums support special features such as an ability to search through posts for specific words or phrases. It is common for some discussions that occur within a forum environment to become relatively dynamic and spontaneous.

A more specific example of a network-based discussion environment is a newsgroup. A newsgroup is commonly implemented as a topic-focused public discussion forum on the Internet. Postings within a newsgroup generally take the form of electronic messages that are addressed not to a specific individual but instead to the newsgroup itself. Some newsgroup systems are configured to "thread" discussion to support an organization of various topics around a central theme. In many cases, a user must subscribe to a newsgroup in order to participate and/or track a discussion on an ongoing basis.

Another specific example of a network-based discussion environment is a mailing list, which, generally speaking, is an e-mail based discussion group. Many mailing lists are implemented such that a list server receives an email from a user and sends corresponding mail to a set of users included on a mailing list. A moderator may screen incoming messages and, in some cases, cancel distribution. In many cases, users join a mailing list through subscription. Many mailing lists are focused on a particular topic. In some cases, a mailing list may be configured such that a user selects a hyperlink, thereby initiating a function that enables the user to post a message to subscribers.

Network-based discussion environments such as, but not limited, those specifically mentioned above, can suffer from bursts of posting activity resulting in runaway threads. In many cases, the longer a thread becomes, the less relevant posts become to many participants, which results in an increased noise-to-signal ratio and a decreased overall list value. Decreasing relevancy from the perspective of many list participants has proven to be a relatively common occurrence, especially in discussion environments wherein a variety of discussion topics are associated with a broad primary category. While some posts under a given topic will be interesting to many participants, there inevitably will be less relevant posts, particularly in cases where a thread of posts under a given topic becomes relatively long.

Discussion moderation is one way to encourage posts with high relevance to many participants. For example, a discussion can be moderated manually by one or more individuals that review a post and determine how, when and whether the post should be accepted. For obvious reasons, this type of moderation is burdensome and expensive due to necessary human involvement.

Another type of moderation is automatic moderation. Because there is a potential correlation between long threads and decreasing relevancy, one option for automatic moderation is to place a limit on the number of posts a user can make. One drawback associated with this approach is that some members are naturally more prolific and provide more valuable information and/or opinions than others. Thus, limiting posts may actually decrease the value of discussion.

Another option for automatic moderation is to limit the maximum length of a thread. One disadvantage associated with this option is that opportunities for good discussion may be lost because some threads are simply more interesting than others. The earliest posts to a thread may not necessarily be the most relevant or valuable.

The discussion above is merely provided for general background information and is not intended for use as an aid in determining the scope of the claimed subject matter. Also, it should be noted that the claimed subject matter is not limited to implementations that solve any noted disadvantage.

SUMMARY

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter.

Within a network-based discussion environment, a moderation mechanism is implemented to encourage posts of high relevancy. The moderation mechanism is configurable so as to support distributed access control. In one case, the moderation mechanism is configured to support an allocation of a limited number of responses to a user based on the number of new threads the user has started.

DETAILED DESCRIPTION

Figure 1:
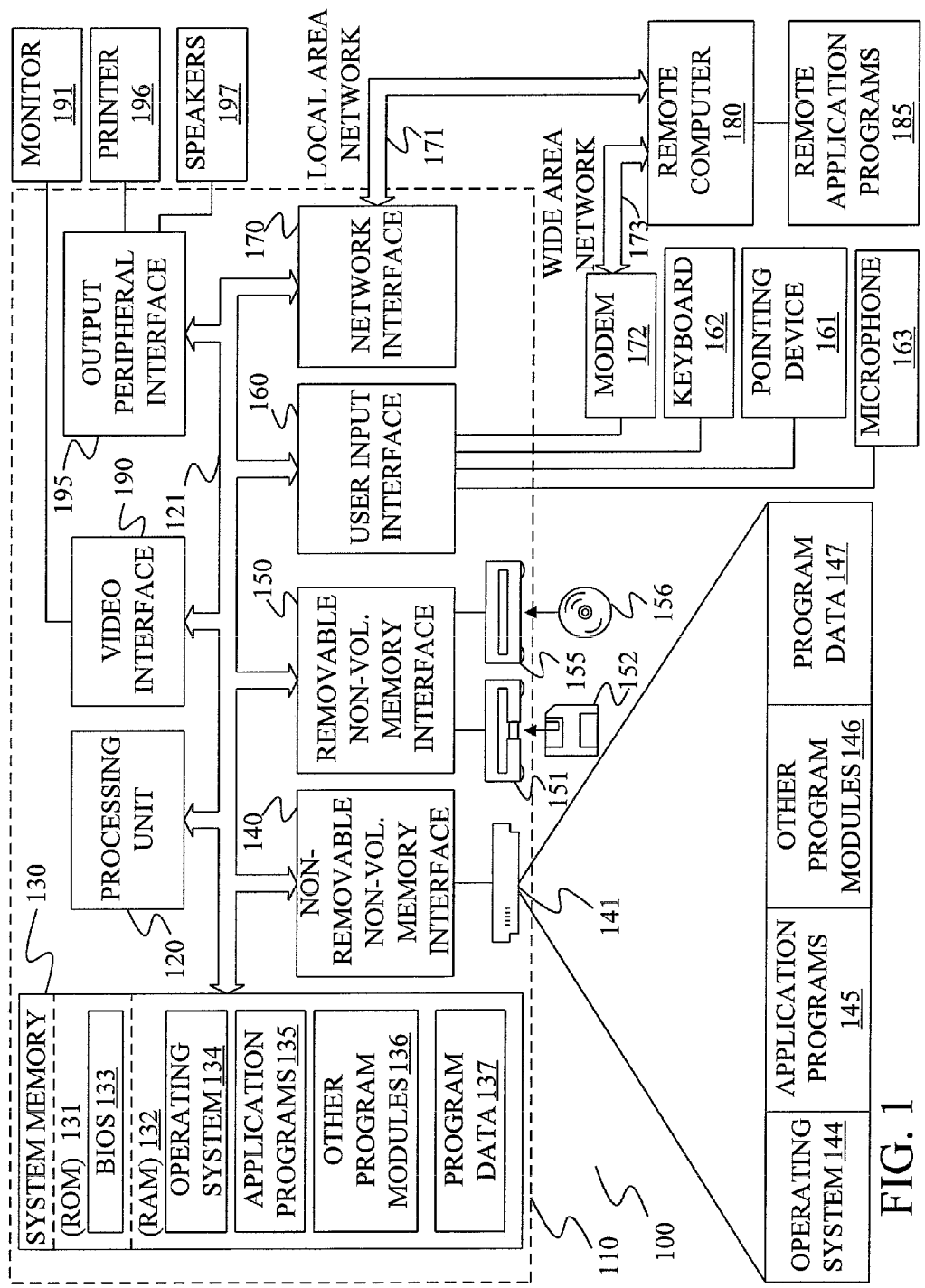
FIG. 1 is a block diagram of one computing environment in which some embodiments may be practiced.

FIG. 1 illustrates an example of a suitable computing system environment 100 in which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2A:
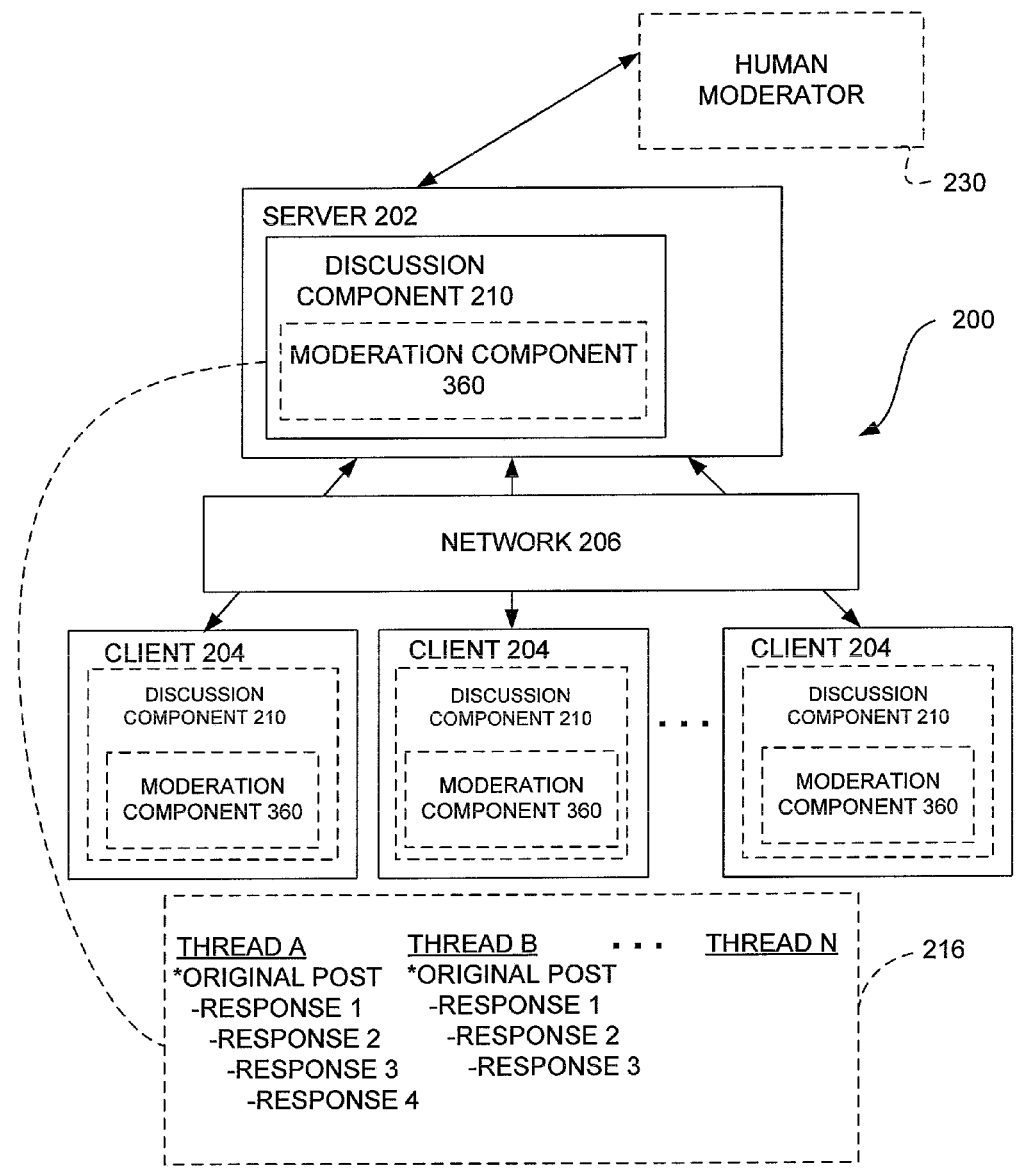
FIGS. 2A and 2B are schematic diagrams illustrating examples of system environments in which some embodiments may be practiced.
Figure 2B:
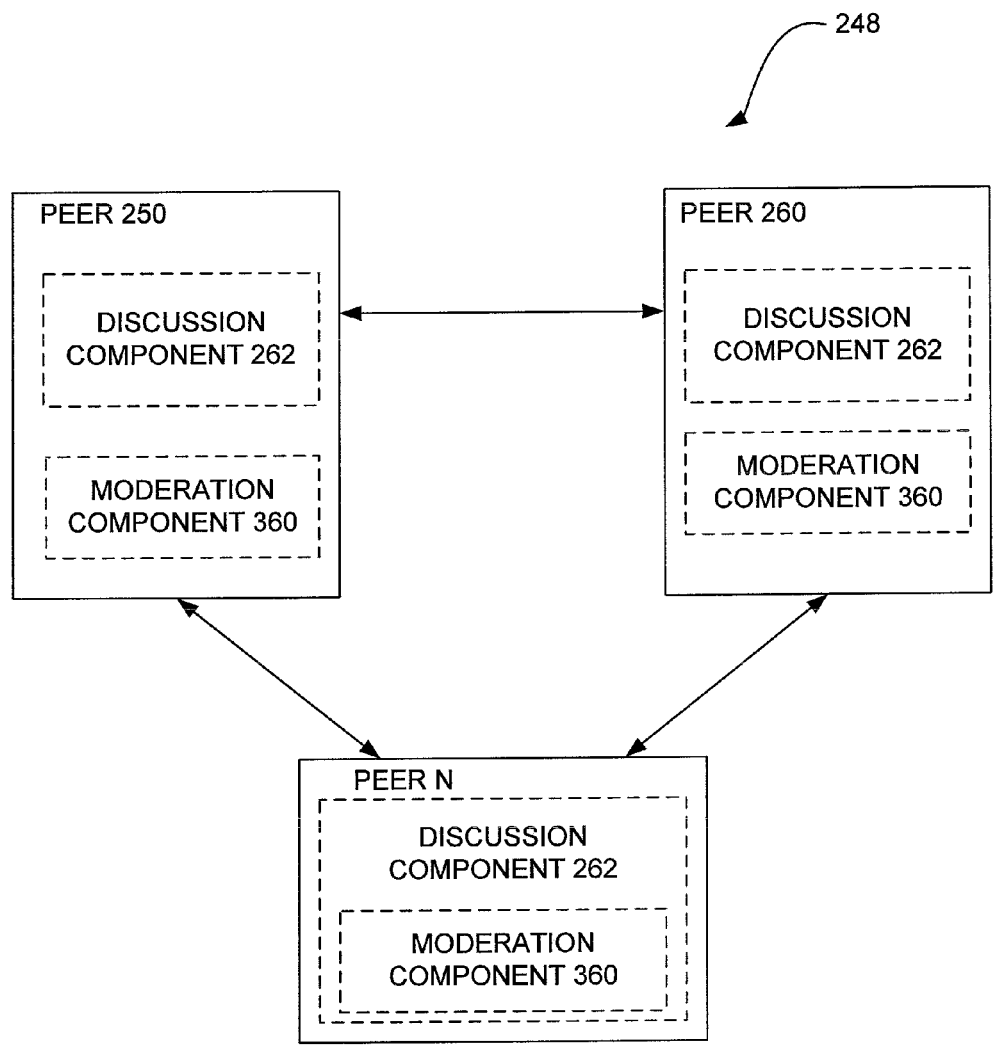

FIGS. 2A and 2B are schematic block diagrams illustrating examples of system environments 200 and 248 in which embodiments may be implemented. These systems are only examples of suitable computing systems and are not intended to suggest any limitation as to the scope of use or functionality of the invention. Neither should the systems be interpreted as having any dependency or requirement relating to any one or combination of illustrated components.

System 200 shown in FIG. 2A includes a server 202 that is configured for communication across a network 206 with a plurality of client devices 204. While three client devices 204 are illustrated, it is to be understood that the system may actually include more or fewer devices. Network 206 can be any type of means for supporting communication such as, but certainly not limited to, the Internet.

Server 202 includes a discussion component 210 that is configured to facilitate a post-oriented form of communication amongst users of the client devices 204. Box 216 contains one example of what post-oriented communication may look like from a user's perspective. Box 216 is shown in dots to emphasize that the illustrated communication scheme is but one example taken from many ways in which communication may actually be conducted.

The communication scheme shown in box 210 is organized in accordance with a thread-based format. Each of the illustrated threads (A, B, through a variable number N) is illustratively devoted to a particular discussion topic. All of the threads may fall within a broad overall category of discussion. For example, a user interface associated with discussion component 210 may be customized to create a perception that all the threads in box 216 are associated with a broad topic, for example, digital photography. In such cases, each individual thread is likely to be devoted to a sub-topic under the assigned broad category. For example, threads under the broad topic of digital photography will be dedicated to narrower, related subject matter, such as discussions about camera lenses, lighting, etc.

Each thread includes an originating post that sets the stage for subsequent discussion. In essence, the original post begins a conversation oriented toward a particular topic. A user associated with a client device 204 can illustratively begin a new thread by interacting with discussion component 210 so as to submit an original post. In one embodiment, a human moderator 230, indicated in FIG. 2A as an optional component, reviews submissions of original posts and makes a decision as to which ones will or will not be allowed to be utilized as a basis for a new thread. The human moderator 230 can base this decision upon any criteria such as, but certainly not limited to relevancy to a theme or even subjective or perceived quality.

Users of the client devices 204 are allowed to post responses to original posts or responses to responses. In one embodiment, human moderator 230 may review, edit and/or delete some or all posted responses. Discussion and conversation develops as users, through interaction with server discussion component 210, review and respond to original posts and responses submitted by others.

As described up to this point, discussion component 210, which is maintained on server 202, is configured to facilitate post-oriented discussion amongst the users of client devices 204. Discussion component 210 illustratively comprises software that includes a user interface configured to support interactions with a human moderator and/or a user of a client device 204. Each client 204 is illustratively configured with means for accessing and interacting with software component 210. For example, in one embodiment, access and interaction with discussion component 210 is conducted through a web browser application.

In another embodiment, discussion component 210 is configured to facilitate discussion in cooperation with a client-side software component (illustrated in FIG. 2A as optional discussion components 212). In other words, at least a portion of the software for supporting discussion is implemented on a client device itself. In one embodiment, discussion component 212 is an application configured to supplement the functionality of a standard web browser (e.g., a plug-in application).

Thus, FIG. 2A presents a client-server discussion environment. Other alternatives are contemplated as well. System 248 shown in FIG. 2B is an example of an applicable peer-to-peer discussion environment wherein discussion is facilitated amongst users of peer devices 250, 260 and users of other peer devices up to a variable number N. System 248 is provided to emphasize the fact that not all discussion environments need be implemented in the context of an actual server configured to facilitate discussion. Within system 248, depending on the precise details of implementation, one or more of the peer devices will implement a software component (illustrated in FIG. 2B as optional discussion component 262) configured to facilitate discussion amongst users of the peer devices. Regardless of how implemented, discussion amongst the users of the peer devices is illustratively post-oriented and, for example, is carried out in a manner similar to the discussion scheme described in relation to box 216 in FIG. 2A.

In summary, software components for supporting a discussion environment can be implemented centrally or can be distributed across multiple devices. The software can be implemented centrally from a server or from a single peer within a network of peers. Alternatively, the software can have cooperating components distributed, for example, across clients and servers within a network, or, across multiple peers in a network.

In one embodiment, a software mechanism configured to perform some level of automated discussion moderation is implemented within a discussion system in order to encourage responses with high relevance to many discussion participants. In the discussion below, this type of software mechanism will be referred to as a moderation component.

Figure 3:
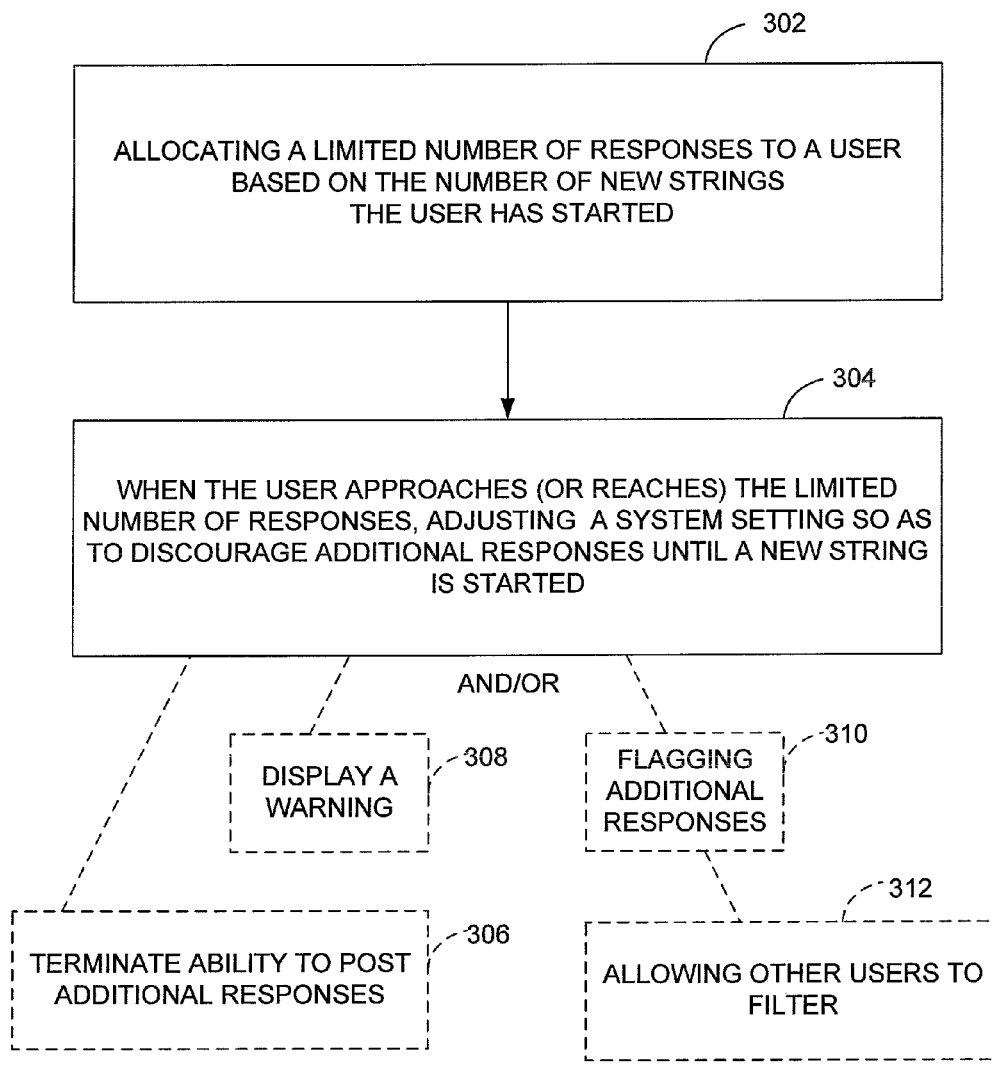
FIG. 3 is a block flow diagram illustrating functionality to be carried out by a moderation mechanism.

FIG. 3 is a block flow chart illustrating functionality to be carried out by a moderation mechanism within a discussion system. The first function, in accordance with block 302, involves an allocation of a limited number of response to a user based on the number of new threads the user has started.

In accordance with block 304, when the user approaches (or reaches depending on how the system is set up) the limited number of responses, a feature of the discussion system is adjusted so as to discourage additional responses until the user starts at least one new thread.

Blocks 306, 308, 310 and 312 illustrate specific system actions that can be taken to discourage additional responses. In accordance with block 306, the discussion system can be adjusted to terminate the user's ability to post additional responses until additional responses are earned (i.e., by starting a new thread). In accordance with block 308, a warning is displayed to the user as an indication that the limit has or is about to be reached. In accordance with block 310, after the limit has been reached, additional responses are posted but those responses are flagged as having been posted beyond the user's allotted number of responses. In one embodiment, a user can configure their experience with the discussion system to filter out any responses posted beyond a user's threshold. In one embodiment, blocks 308 and 310 are combined in that a warning is displayed and subsequent posts are flagged.

In one embodiment, the process of allocating a limited number of responses to a user based on the number of new threads the user starts is carried out in accordance with the following equation:

$$\text{\# of responses allowed} < N * \text{\# of new threads started} \qquad \text{Equation 1}$$

In other words, the number of responses allotted to a given user is less than (or the system could be configured to support equal to) an adjustable variable 'N' multiplied by the number of new threads the user has started. The variable N is illustratively a numeric value selected, for example, by a human moderator or a discussion manager.

Applying the described algorithm through a moderation mechanism results in an organized discussion board wherein the average thread length is statistically limited to being less than or equal to N. In accordance with this approach, there is no arbitrary length limit for any particular thread. There is no arbitrary post limit for participants. Discussion traffic is limited by dynamically limiting the length of threads without restricting the number of new threads.

An assumption underlying the described approach is that people who start many new threads tend to be more valuable (i.e., have more original thoughts, opinions, information, etc.). Thus, the method enables these people to post more replies to existing threads. Further, another assumption is that new threads are typically more relevant to many users because starting a new topic, to some extent, involves going out on a limb. Under these circumstances, many people tend to exercise healthy self-censorship. On the other hand, responding to an existing thread, especially that that is already out of control (i.e., has become less relevant to many), involves much more impulse posting. This is generally why long threads tend to become irrelevant to many if not most participants.

The described automated moderation approach works well in combination with a human moderator. For example, a human moderator focuses on reviewing and, if necessary, rejecting new threads, wherein rejected new threads do not qualify a user for additional responses. Simultaneously, the automated moderation component will impact the quality of discussion development within new threads.

In one embodiment, just as the software for facilitating discussion can be implemented on a distributed or centralized basis, so too can a moderation component. For example, a moderation component can illustratively be implemented by the client devices used to post to discussion lists (i.e., within FIG. 2A, an optional moderation component 360 is shown within each discussion component 212). Alternatively, however, a moderation component can be implemented from the central source with which a discussion list is maintained (i.e., within FIG. 2A, an optional moderation component is shown within the discussion component 210. It is also possible to implement a moderation component having functionality divided between the clients and central source. Similar arrangements are conceivable in peer to peer devices, where all peers are equal and perform the same functionality and there isn't a distinction between client and server component.

Figure 4:
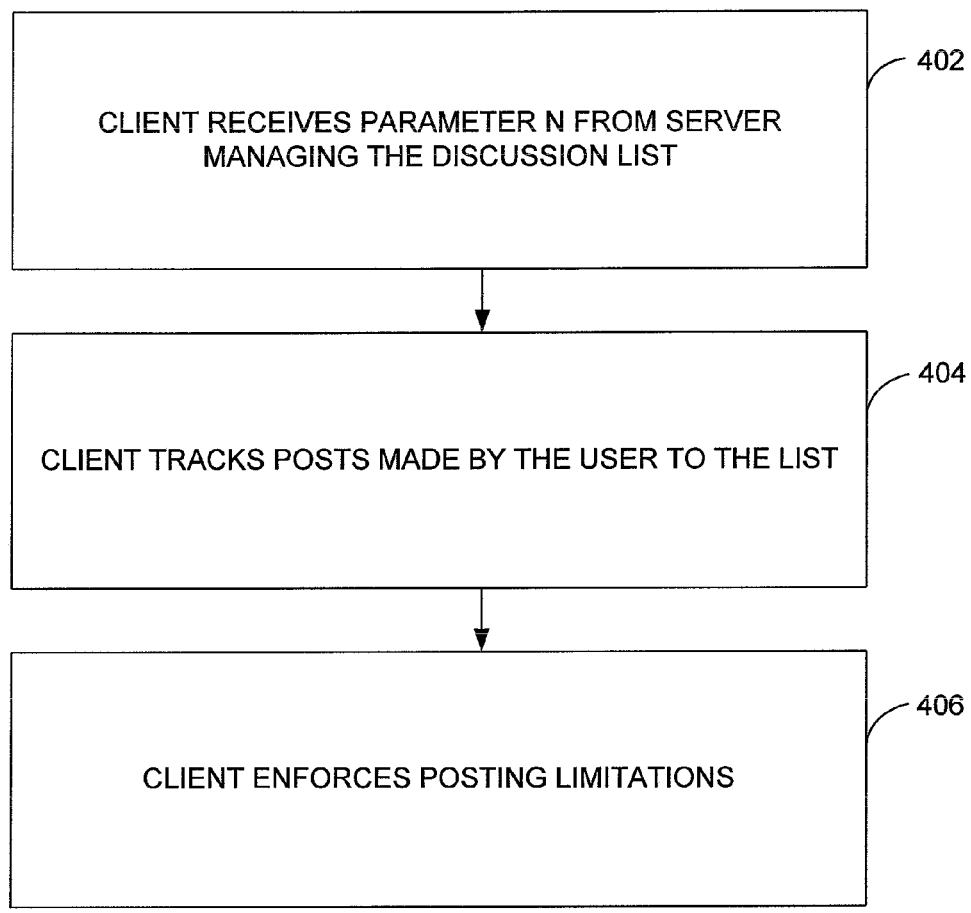
FIG. 4 is a block flow diagram illustrating steps associated with distributed access control.

FIG. 4 is a block flow chart illustrating steps associated with one embodiment of a distributed implementation of a moderation mechanism. In this case, the moderation mechanism operates based on the application of Equation 1 described above. In accordance with block 402, a client (or a peer operating as a client) receives parameter 'N' from the server that manages the discussion list (or a peer being part of the discussion list). The client then tracks the number of posts an associated user makes to the list. Replies to existing threads are illustratively distinguished form posts that are new threads. The client illustratively tracks a count 'R' representing the number of reply posts by the user to existing threads. A second count T is tracked to account for the number of new threads initiated by the user.

Then, before each reply post, the client validates the following formula:

$$R < N * T \qquad \text{Equation 2}$$

If the result is TRUE, then the post is sent. If the result is FALSE, then the client can facilitate any of a variety of actions depending on a desirable or predetermined level of enforcement. In one embodiment, the server dictates to the client what enforcement actions should be taken. Examples of actions were described in relation to boxes 306, 308, 310 and 312 in FIG. 3. It should be noted that Equation 2 could be similarly implemented without departing from the scope of the present invention. For example, the equation could be adjusted to accommodate as TRUE the instance where R is equal to or less than N*T.

In one embodiment of a centralized implementation a server (or a peer configured to operate similar to a server) is configured to operate in a manner similar to the operation of the client described in relation to FIG. 4. The exception, however, is that the server will keep statistics for a set of users (all non-registered users, all users, etc.) and perform access control validation and enforcement upon receipt of a new post from a user included in the set.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for encouraging relevant posts within a network-based discussion environment, the method comprising:

having a set of discussion threads, each including an original thread-starting post comprising a first posted entry in the thread that solicits one or more responses in the thread;

determining, from the set of discussion threads, a number of the discussion threads a user has started by posting the original thread-starting post in the discussion thread;

utilizing a computer processor to allocate a limited number of responses to the user based on the number of discussion threads the user has started;

determining that the user has posted a number of responses to reach a threshold number of responses;

in response to the determination, adjusting a system setting to discourage the user from posting an additional response until a new thread is started by the user posting an additional original thread-starting post; and wherein the adjusting a system setting comprises:

terminating the ability of the user to post any additional responses without starting a new thread by the user posting an additional original thread-starting post.

2. The method of claim 1, wherein adjusting a system setting comprises:

displaying a warning when the user attempts to post any additional responses without starting a new thread by the user posting an additional original thread-starting post.

3. The method of claim 1, wherein adjusting a system setting comprises adjusting a setting associated with client-side system utilized by the user.

4. The method of claim 1, wherein adjusting a system setting comprises adjusting a setting associated with a server-side system accessed by the user through a client system.

5. The method of claim 1 further comprising: determining that the user is about to reach the limited number of responses, and, in response, displaying a warning when the user attempts to post an additional response without starting a new thread by the user posting an additional original thread-starting post.

6. The method of claim 1, wherein allocating further comprises performing a comparison of a threshold value to the number of posts the user has posted, the threshold value being the number of new threads the user has started multiplied by an adjustable variable.

7. The method of claim 6 further comprising, based on the comparison, adjusting a system setting so as to discourage the user from posting an additional response until a new thread is started.

8. The method of claim 1, further comprising performing an evaluation of a proposed new thread submitted by the user relative to a predetermined set of criteria that must be satisfied in order for the proposed new thread to be included in the network-based discussion as a new thread for response by other users.

9. The method of claim 8, wherein performing an evaluation is a step performed by a human moderator that subjectively determines whether or not to allow the proposed new thread to become a new thread.

10. A computer-implemented method for encouraging relevant posts within a network-based discussion environment, the method comprising:

having a set of discussion threads, each having a thread length in terms of a number of posts in the thread including at least an original thread-starting post comprising a first posted entry in the thread that solicits one or more response posts in the thread;

establishing a threshold for thread length based on the number of threads in the set of discussion threads;

analyzing the set of threads to calculate an average length of the threads;

enforcing a limitation on thread-posting to the set of discussion threads based on the average length of threads in the set of discussion threads compared to the threshold; and increasing the threshold in response to creation of a new thread in the set of discussion threads, wherein enforcing limitations comprises terminating a particular user's ability to post a response until the particular user begins a new thread by posting an original thread-starting post in the new thread.

11. The method of claim 10, wherein the method further comprises identifying said new threads by identifying instances of a first thread-starting post.

* * * * *